United States Patent [19]

Trueb et al.

[11] Patent Number: 5,524,669
[45] Date of Patent: Jun. 11, 1996

[54] THERMAL INSULATION FOR ANGLE-VALVE PIPING

[75] Inventors: Steven R. Trueb; Thomas W. Trueb, both of Ellington, Conn.

[73] Assignee: Truebro, Inc., Ellington, Conn.

[21] Appl. No.: 426,091

[22] Filed: Apr. 21, 1995

Related U.S. Application Data

[63] Continuation-in-part of Ser. No. 199,959, Feb. 22, 1994, Pat. No. 5,419,364, which is a continuation-in-part of Ser. No. 44,026, Apr. 8, 1993, Pat. No. 5,303,730, which is a continuation-in-part of Ser. No. 944,836, Sep. 14, 1992, Pat. No. 5,259,410, which is a continuation-in-part of Ser. No. 754,048, Sep. 3, 1991, Pat. No. 5,163,469, which is a continuation-in-part of Ser. No. 569,995, Aug. 20, 1990, Pat. No. 5,054,513.

[51] Int. Cl.$^6$ ........................................ F16L 7/00
[52] U.S. Cl. .................. 137/375; 138/155; 138/158; 285/47
[58] Field of Search .................. 137/375; 285/47; 138/155, 158

[56] References Cited

U.S. PATENT DOCUMENTS

| | | | |
|---|---|---|---|
| 124,770 | 3/1872 | Stetson et al. | |
| 2,650,180 | 8/1953 | Walker | 154/44 |
| 2,937,662 | 5/1960 | Green | 138/25 |
| 3,153,546 | 10/1964 | Dunn | 285/13 |
| 3,177,528 | 4/1965 | Flower et al. | 18/36 |
| 3,402,731 | 9/1968 | Martin | 137/375 |
| 3,559,694 | 2/1971 | Volberg | 138/147 |
| 3,598,157 | 8/1971 | Farr et al. | 138/157 |
| 3,719,209 | 3/1973 | Rush et al. | 138/177 |
| 3,960,181 | 6/1976 | Baur et al. | 138/178 |
| 4,205,105 | 5/1980 | Blundell | 428/36 |
| 4,441,743 | 4/1984 | Steenbergen | 285/21 |
| 4,463,780 | 8/1984 | Schultz et al. | 138/178 |
| 4,669,509 | 6/1987 | Botsolas | 138/178 |
| 4,840,201 | 6/1989 | Botsolas | 138/178 |
| 5,303,730 | 4/1994 | Trueb et al. | 137/375 |
| 5,419,364 | 5/1995 | Trueb et al. | 137/375 |

FOREIGN PATENT DOCUMENTS

| | | |
|---|---|---|
| 2538076 | 6/1984 | France . |
| 3723394 | 2/1989 | Germany . |

OTHER PUBLICATIONS

Skal+Gard (TCI Products) 4-p. brochure dated Oct. 1994.

*Primary Examiner*—A. Michael Chambers
*Attorney, Agent, or Firm*—Ira S. Dorman

[57] ABSTRACT

A one-piece body of thermal insulation comprises a first component having valve-covering and pipe-covering portions, and a second, perpendicular component for covering the water-supply tube. An integral cover component on the forward end of the valve-covering portion is displaceable for access to the valve handle, and can be secured in its closed position.

11 Claims, 2 Drawing Sheets

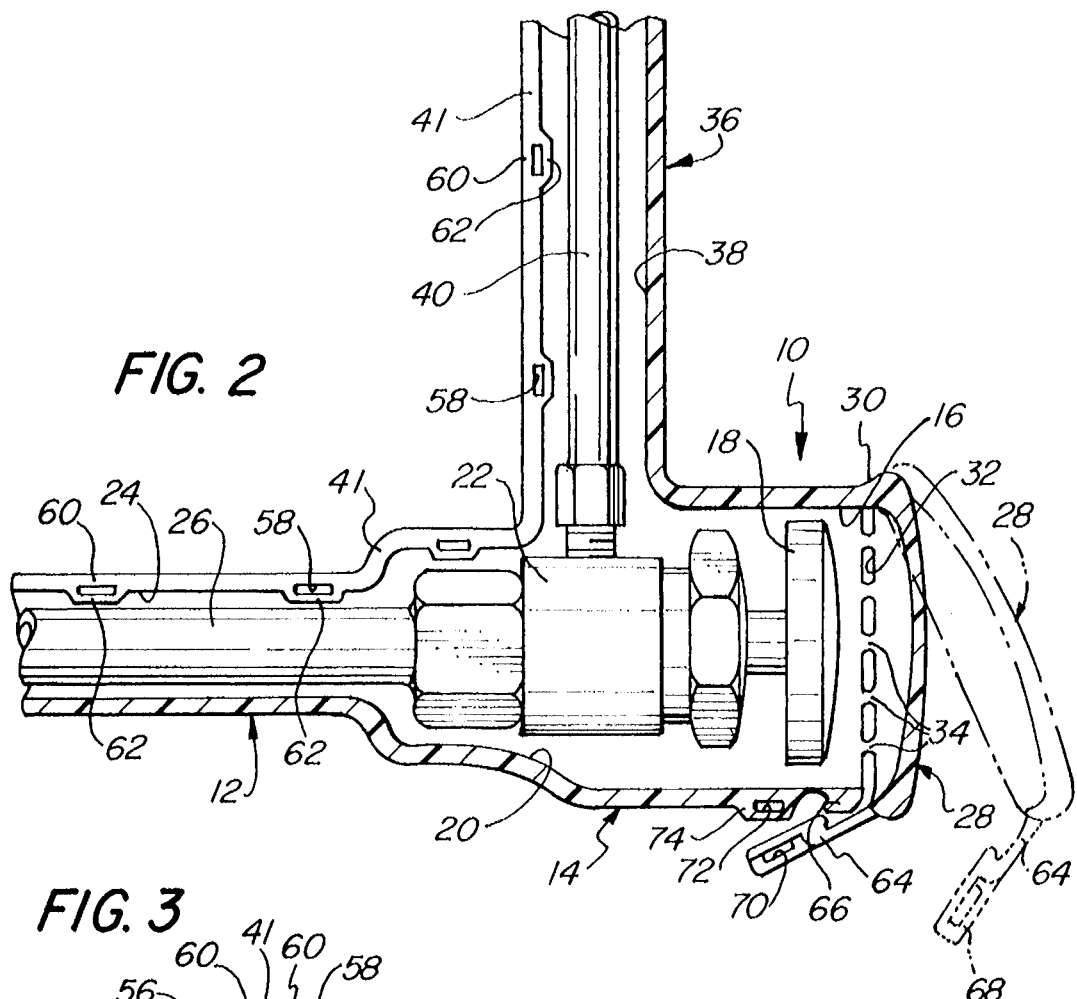
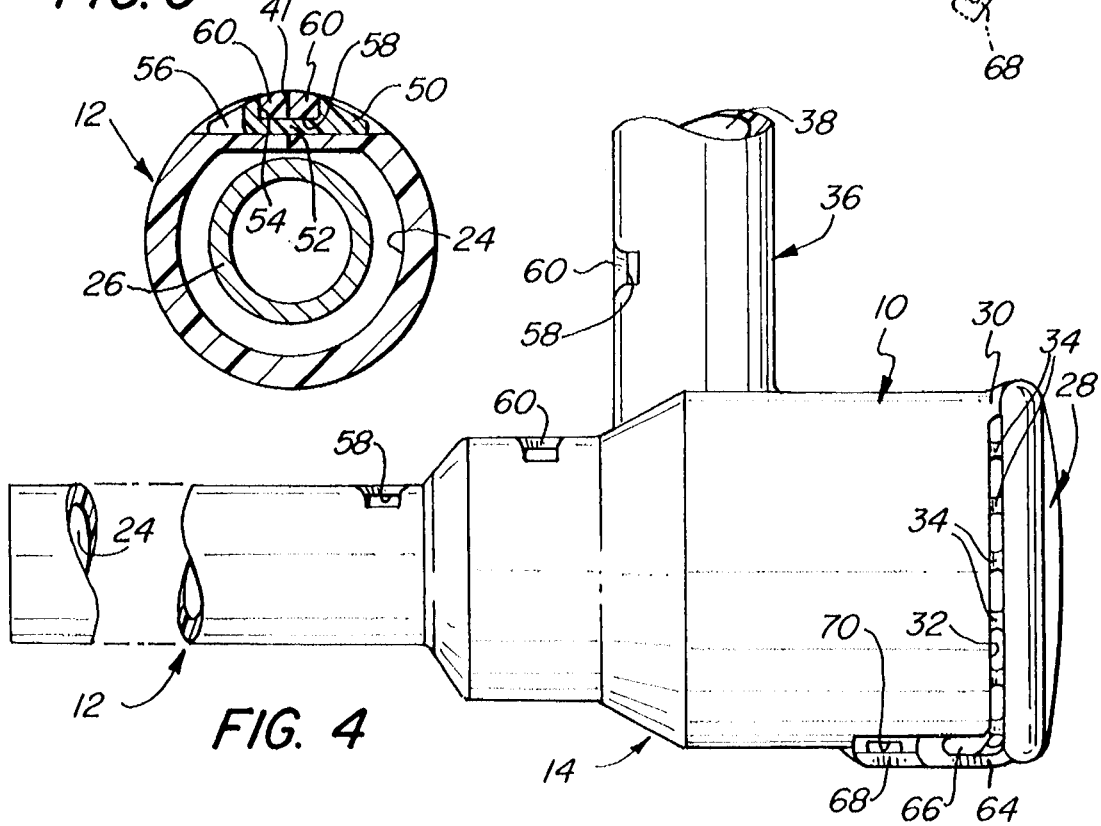

THERMAL INSULATION FOR ANGLE-VALVE PIPING

CROSS-REFERENCE TO RELATED APPLICATION

This application is a continuation-in-part of application for Letters Patent Ser. No. 08/199,959, filed Feb. 22, 1994 and now issued as U.S. Pat. No. 5,419,364, which is a continuation-in-part of application for Letters Patent Ser. No. 08/044,026, filed Apr. 8, 1993 and now issued as U.S. Pat. No. 5,303,730, which is a continuation-in-part of application for Letters Patent Ser. No. 07/944,836, filed Sep. 14, 1992 and now issued as U.S. Pat. No. 5,259,410, which is a continuation-in-part of application for Letters Patent Ser. No. 07/754,048, filed Sep. 3, 1991, and now issued as U.S. Pat. No. 5,163,469, which is in turn a continuation-in-part of application for Letters Patent Ser. No. 07/569,995, filed Aug. 20, 1990 and now issued as U.S. Pat. No. 5,054,513.

BACKGROUND OF THE INVENTION

Regulations in place in many municipalities require that the so-called "P-trap" assembly (i.e., the waste-water piping under sinks and the like), and the hot-water-supply piping, be insulated so as to prevent injury from contact with hot metal surfaces. Wheelchair-bound individuals are at particular risk.

The required thermal insulation may be supplied by wrapping or otherwise applying lengths of insulation (such as of foam rubber and the like) about the pipes. Such practices are however undesirable for a number of reasons: application is often difficult and time-consuming; the applied insulating material tends to become disoriented and displaced; the finished installation is typically unaesthetic; and often the result is simply ineffective.

The prior art suggest a wide variety of pipe covering techniques and structures. For example, Far et al U.S. Pat. No. 3,598,157 discloses preformed covering pieces made of foamed plastics and configured for various pipe fittings. Blundell U.S. Pat. No. 4,205,105 shows an elongated pipe-insulating structure that is axially slit along one side, and Martin U.S. Pat. No. 3,402,731 provides foamed insulating sleeves for pipe elements.

U.S. Pat. Nos. 2,650,180, 2,937,662, 3,153,546, 3,559,694, 4,441,743 and 4,840,201, to Walker, Green, Dunn, Volberg, Steenbergen and Botsolas, respectively, all show encased insulating structures applied to pipes and fittings; U.S. Pat. Nos. 3,960,181, 4,463,780 and 4,669,509, to Baur et al, Schultz et al and Botsolas, respectively, provide one-piece covering wrappings fabricated from flexible plastic materials; and U.S. Pat. Nos. 3,177,528 and 3,719,209, to Flower et al and Rush et al, respectively, are directed to electrically insulated coatings for pipe fittings and to extruded plastic plumbing traps.

Despite the activity in the art indicated by the foregoing, there has been a need for means by which under-sink piping can quickly, easily, and inexpensively be thermally insulated. The inventions claimed in Applicants' U.S. Pat. Nos. 5,054,513, 5,163,469, 5,259,410 and 5,303,730, and in their copending application Ser. No. 08/199,959, provide thermal insulation systems and installations by and in which the foregoing needs are well satisfied; the invention hereof augments the foregoing.

SUMMARY OF THE INVENTION

It is a broad object of the present invention to provide novel insulation for the angle-valve piping of a sink or the like.

More specific objects of the invention are to provide such insulation which is of relatively simple and inexpensive construction, is versatile in use, and is quick and easy to employ.

It has now been found that certain of the foregoing and related objects of the invention are attained by the provision of thermal insulation comprising a tubular body of unitary construction, integrally formed as a single piece from a resiliently yieldable material having thermal insulating properties. The body has an elongate first component, with forward and rearward opposite ends, defining a first passage extending along its longitudinal axis, and an elongate second component, with upper and lower opposite ends, defining a second passage extending along its longitudinal axis. The "first" component has a valve-covering portion adjacent its forward end, and a pipe-covering portion extending rearwardly therefrom to its rearward end. The longitudinal axes of the first and second components are mutually perpendicular, and the lower end of the "second" component joins the valve-covering portion of the "first" component, with the first and second passages intersecting thereat.

The location at which the second component joins the valve-covering portion will usually be spaced from the forward end of the first component, and the body will usually be slit to permit facile installation; preferably, the slit will extend continuously along the rearward side of the second component and the upper side of the first component. In most instances, the valve-covering portion of the first component will define a section of the first passage that is generally larger, in planes transverse to the axis, than the section of the first passage defined by the pipe-covering portion.

Other objects of the invention are attained by the provision of insulation of the kind described, which includes an integrally formed cover component disposed at the forward end of the valve-covering portion. The cover component is readily displaceable between an open position, for permitting access to the first passage, and a substantially closed position disposed over the first passage. Preferably, the insulation will include means for securing the cover component in its substantially closed position, which securing means will most desirably comprise interengagable latching elements that are integrally formed on the cover component and the valve-covering portion.

BRIEF DESCRIPTION OF THE DRAWINGS

FIG. 2 is a fragmentary sectional view of the insulation of FIG. 1, taken along line 2—2 thereof and shown covering angle valve piping;

FIG. 3 is a sectional view taken along line 3—3 of FIG. 1 and drawn to an enlarged scale;

FIG. 4 is a fragmentary side elevational view of the insulation of FIG. 1; and

DETAILED DESCRIPTION OF THE ILLUSTRATED EMBODIMENTS

Figure 5:
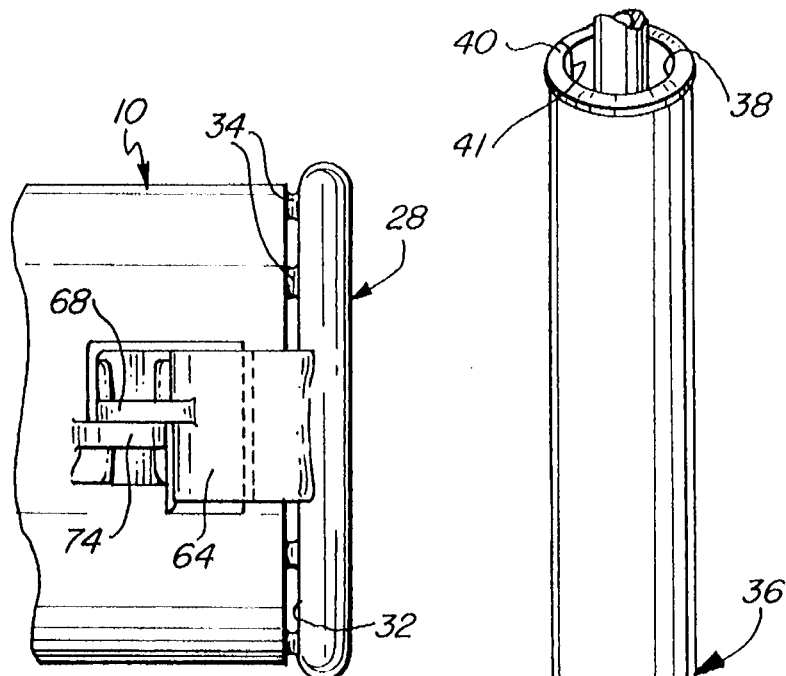
FIG. 5 is a fragmentary bottom view of the forwardmost part of insulation, drawn to a further enlarged scale.

With specific reference now to the drawings, the insulation shown therein is molded from a resiliently yieldable, rubbery, thermally insulating material. It consists of a tubular body that includes an elongate first component, comprised of a valve handle-covering portion at one end, a pipe-covering portion at the other end, and an intermediate valve body-covering portion, which portions are generally designated respectively by the numerals 10, 12 and 14. As is best seen in FIG. 2, a passage extends along the longitudinal axis of the first component; it consists of a relatively large section 16 at the forward end, for the containment of the handle 18 and associated structure of the angle valve, a generally smaller adjacent section 20 for the containment of the valve body 22, and an opposite end section 24 for receipt of the water inlet pipe 26.

Cover component 28 is integrally formed with the remainder of the body, and is attached to the valve handle-covering portion 10 by a hinge element 30. A circumferential slot 32 extends from the opposite ends of the hinge element 30 and substantially surrounds the cover component 28, the slot 32 being interrupted by a number of nips, or weak connecting elements 34, at spaced locations therealong. When access to the valve handle 18 is desired, the cover component 28 can readily be displaced (e.g., to the phantom-line position of FIG. 2) by pivoting it on the hinge element 30, with the connecting elements 34 being easily torn in the process. Because the hinge element 30 is positioned at the top of the insulation, as installed, the cover component 28 will naturally assume a substantially closed position in the absence of lifting force.

The insulation also includes an integrally formed elongate second component, generally designated by the numeral 36, which defines a longitudinal passage 38 of uniform diameter. The second component 36 joins the valve body-covering portion 14 of the first component at a right angle, with the passages thereof intersecting perpendicularly so as to adapt the component 36 for the containment of a water supply tube 40. A continuous slit 41 extends longitudinally along both components, thereby permitting facile application of the body, as a single piece, to an existing pipe installation; other means may however be employed, and it will be appreciated that the insulation may be furnished fully intact (i.e., in seamless form) for on-site adaptation, if so desired.

The body components of the insulation are secured by use of fasteners, preferably of the kind described and claimed in copending Trueb et al application Ser. No. 08/309,055, which is of common assignment herewith and has now issued as U.S. Pat. No. 5,454,392. More particularly, the fastener consists of a body component, generally designated by the numeral 42, and a tail component generally designated by the numeral 44. It is of one-piece construction, integrally formed in most instances from a synthetic material such as DELRIN (acetal resin) or the like. An indentation or groove 46 extends transversely at the intersection between the body and tail components, and serves to facilitate fracture at that location for manual disconnection of the components. A series of tooth elements 48 are formed along the length of the tail component, to promote secure manual gripping.

Flat surfaces, on shoulder elements 50,50' and rectilinear connecting segment 52, define a downwardly extending channel 54 traversing the body component 42. The shoulder elements 50,50' taper outwardly from the channel 54 in opposite directions, and have smooth, inclined upper surfaces thereon. The free end of the body component 42 is bifurcated to define an axial slot 56.

Figure 1:
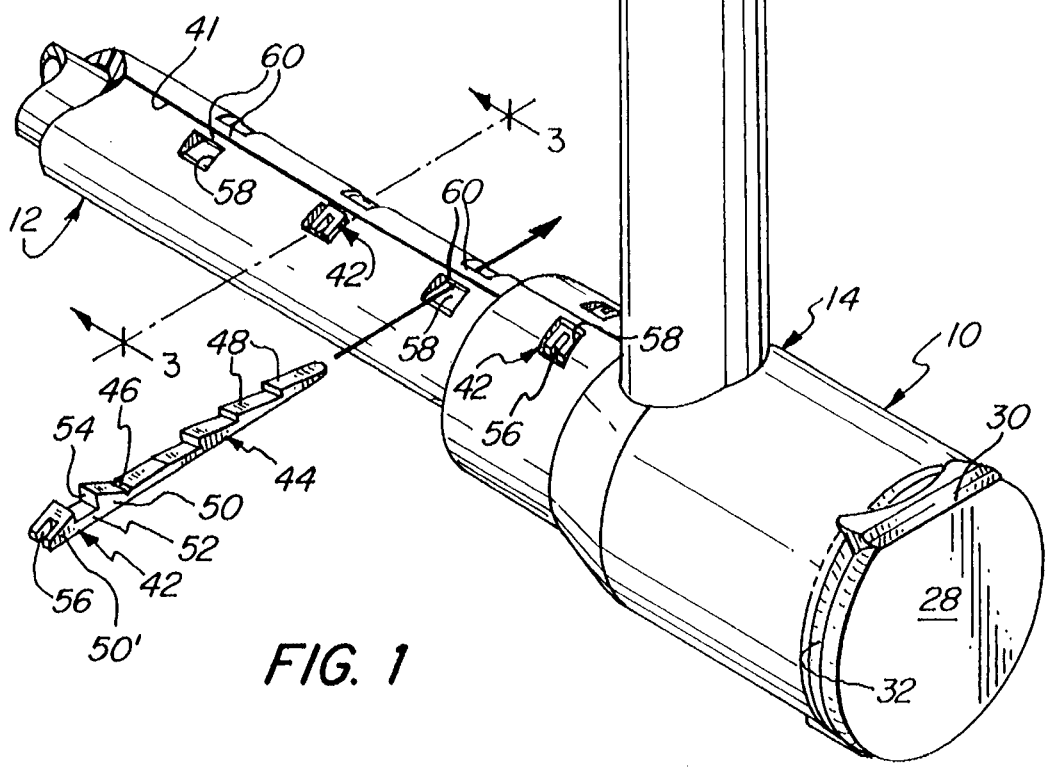
FIG. 1 is a fragmentary perspective view of thermal insulation embodying the present invention.

The marginal portions that extend along the slit 41 in the elongate components are formed with aligned apertures 58, which cooperatively define tangential passageways with overlying bridge elements 60; reinforcing bosses 62 project into the passages through the components. As seen in FIG. 1, the fastener is inserted by threading the tail component 44 through the passageway defined by the aligned apertures 58. Pulling force applied to the tail component will cause the inclined surface of the shoulder 50 to slide under the first-encountered bridge element 60, whereupon both adjacent elements 60 will seat and engage within the transverse channel 54. The body component will thereby affix the bridge elements 60 in close proximity, holding the marginal portions of the components together and thereby securing the insulation piece on the associated piping.

Once installed, the tail component 44 can readily be broken away from the body component 42 by manual manipulation. Release of the remaining fastener component can readily be achieved, if desired, merely by inserting the tip of a screwdriver into the axial slot 56 and rotating the component 180° to present the bottom surface of the connecting segment 52 to the bridge elements 60. This of course permits separation of the marginal portions and ready removal of the insulating piece.

A latching tab 64 is integrally formed on the cover component 28, and cooperates with a reversely directed lip 66 on the adjacent part of the body component to secure the cover component in closed position. An extension 68 on the tab 64 has an aperture 70, which aligns with an aperture 72 through a boss 74 formed adjacent the lip 66 when the latching element is in engaged position. Consequently, a fastener, such as of the kind described above, can be employed to lock the cover component closed, if so desired.

Although the drawings and the corresponding parts of the specification describe the best mode contemplated for carrying out the invention, it will be understood that variations can be made without departing from the novel concepts hereof. The insulation will normally be fabricated from a synthetic elastomeric material such as polyurethane, polyvinyl chloride, or silicon rubber, so as to provide the desired resiliency for facile installation as well as a suitable thermal conductivity value, good cushioning effects, and other desired properties. The material used may have a foamed structure and any desired coloration, and the insulation will typically have a nominal wall thickness ranging from ⅛ inch to ½ inch. Although the pipe-covering portions of the article are shown to be of substantially uniform, circular cross section along their entire lengths, it will be appreciated that sections of difference sizes and shapes may be employed if necessary or desirable. It will also be appreciated that the system can be used to insulate piping of plastic as well as of metal.

Thus, it can be seen that the present invention provides novel thermal insulation for the angle-valve piping if a sink or the like. The insulation is of relatively simple and inexpensive construction; it is versatile in use, and it is quick and easy to employ.

Having thus described the invention, what is claimed is:

1. Thermal insulation for the angle valve piping of a sink or the like, comprising a tubular body of unitary construction integrally formed as a single piece from a resiliently yieldable material having thermal insulation properties, said body having an elongate first component with forward and rearward ends and defining a first passage extending along its longitudinal axis, said first component having a valve-covering portion adjacent said forward end and a pipe-covering portion extending rearwardly therefrom to said rearward end, said body also having an elongate second component with upper and lower opposite ends and defining a second passage extending along its longitudinal axis, said longitudinal axes of said first and second components being mutually perpendicular, and said lower end of said second component joining said valve-covering portion of said first component with said first and second passages intersecting thereat.

2. The insulation of claim 1 wherein said second component joins said valve-covering portion at a location spaced from said forward end of said first component.

3. The insulation of claim 2 wherein said body is slit to permit facile installation upon angle-valve piping of a sink or the like.

4. The insulation of claim 3 wherein the slit in said body extends continuously along the rearward side of said second component and the upper side of said first component.

5. The insulation of claim 1 wherein said valve-covering portion of said first component defines a section of said first passage that is generally larger, in planes transverse to said axis thereof, than the section of said first passage defined by said pipe-covering portion.

6. The insulation of claim 1 further including an integrally formed cover component disposed at said forward end of said valve-covering portion, said cover component being readily displaceable, relative to said valve-covering portion, between an open position, for permitting access to said first passage, and a substantially closed position disposed over said first passage.

7. The insulation of claim 6 further including securing means for securing said cover component in said substantially closed position.

8. The insulation of claim 7 wherein said securing means comprises interengagable latching elements integrally formed on said cover component and said valve-covering portion.

9. Thermal insulation for the angle valve piping of a sink or the like, comprising a tubular body of unitary construction integrally formed as a single piece from a resiliently yieldable material having thermal insulation properties, said body having an elongate first component with forward and rearward ends and defining a first passage extending along its longitudinal axis, said first component having a valve-covering portion adjacent said forward end and a pipe-covering portion extending rearwardly therefrom to said rearward end, said body also having an elongate second component with upper and lower opposite ends and defining a second passage extending along its longitudinal axis, said longitudinal axes of said first and second components being mutually perpendicular, and said lower end of said second component joining said valve-covering portion of said first component with said first and second passages intersecting thereat; a cover component integrally formed with said valve-covering portion and disposed at said forward end thereof, said cover component being readily displaceable, relative to said valve-covering portion, between an open position, for permitting access to said first passage, and a substantially closed position disposed over said first passage; and securing means for securing said cover component in said substantially closed position.

10. Thermal insulation for the angle valve piping of a sink or the like, comprising a tubular body of unitary construction integrally formed as a single piece from a resiliently yieldable material having thermal insulation properties, said body having an elongate first component with forward and rearward ends and defining a first passage extending along its longitudinal axis, said first component having a valve-covering portion adjacent said forward end and a pipe-covering portion extending rearwardly therefrom to said rearward end, a cover component integrally formed with said valve-covering portion and disposed at said forward end thereof, said cover component being readily displaceable, relative to said valve-covering portion, between an open position, for permitting access to said first passage, and a substantially closed position disposed over said first passage; and securing means for securing said cover component in said substantially closed position.

11. The insulation of claim 10 wherein said securing means comprises interengagable latching elements integrally formed on said cover component and said valve-covering portion.

* * * * *